US011034092B2

(12) United States Patent
Boss et al.

(10) Patent No.: US 11,034,092 B2
(45) Date of Patent: Jun. 15, 2021

(54) 3D-PRINTED OBJECT WITH DYNAMIC AUGMENTED-REALITY TEXTURES

(71) Applicant: INTERNATIONAL BUSINESS MACHINES CORPORATION, Armonk, NY (US)

(72) Inventors: Gregory J. Boss, Saginaw, MI (US); Jeremy R. Fox, Georgetown, TX (US); Michael Bender, Rye Brook, NY (US); Zachary A. Silverstein, Austin, TX (US); Daniel Ruiz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/442,644

(22) Filed: Jun. 17, 2019

(65) Prior Publication Data
US 2020/0391442 A1 Dec. 17, 2020

(51) Int. Cl.
B29C 64/386 (2017.01)
G06T 19/00 (2011.01)
(Continued)

(52) U.S. Cl.
CPC .......... B29C 64/386 (2017.08); B29C 64/147 (2017.08); G06K 7/1417 (2013.01); G06T 15/04 (2013.01); G06T 19/006 (2013.01)

(58) Field of Classification Search
CPC .. B29C 64/386; B29C 64/147; G06K 7/1417; G06T 15/04; G06T 19/006
See application file for complete search history.

(56) References Cited

U.S. PATENT DOCUMENTS 8,847,953 B1 9/2014 Cho
9,659,202 B2 5/2017 Kamijo
(Continued)

OTHER PUBLICATIONS

Anonymous, "Augmented reality on 3D printed sub surface model." IP.com Disclosure No. IPCOM000234967D, Publication Date: Feb. 20, 2014; 4 pages.
(Continued)

Primary Examiner — Sing-Wai Wu
(74) Attorney, Agent, or Firm — Schmeiser, Olsen & Watts; Brian M. Restauro

(57) ABSTRACT

An augmented-reality system interacts with a physical object that has been embossed or otherwise labeled with one or more bar-code identifiers. The system extracts data from each identifier and uses each element of extracted data to select a computer-generated texture or object. When displaying the augmented-reality environment to a user, the system either replaces the physical object with the computer-generated object or applies the computer-generated texture to a region of a rendered surface of the computer-generated object. The application's selection of computer-generated objects or textures may be modified at any time by a user command, a context-sensitive or environmental factor, an occurrence of a certain virtual event within the augmented-reality environment, or a configuration setting. A physical object labeled with multiple identifiers may be rendered in the augmented-reality environment as multiple computer-generated objects or with multiple textures that each correspond to a distinct identifier and that may be manipulated independently.

20 Claims, 8 Drawing Sheets

(51) Int. Cl.
*G06K 7/14* (2006.01)
*G06T 15/04* (2011.01)
*B29C 64/147* (2017.01)
*G06T 19/20* (2011.01)

(56) References Cited

U.S. PATENT DOCUMENTS

| | | | |
|---|---|---|---|
| 9,864,940 | B2 | 1/2018 | Flores |
| 9,928,655 | B1 | 3/2018 | Alston |
| 2006/0184013 | A1* | 8/2006 | Emanuel .................. G01S 5/16 600/426 |
| 2011/0134108 | A1 | 6/2011 | Hertenstein |
| 2012/0327117 | A1 | 12/2012 | Weller |
| 2013/0281207 | A1 | 10/2013 | Lyons |
| 2016/0271881 | A1* | 9/2016 | Bostick ................ B29C 64/393 |
| 2017/0357397 | A1* | 12/2017 | Masumoto ............ G06T 19/006 |
| 2018/0053021 | A1 | 2/2018 | Rasheed |
| 2019/0178755 | A1* | 6/2019 | Lee ....................... B33Y 50/00 |

OTHER PUBLICATIONS

Aoki, Hiroshi et al.; AR based ornament design system for 3D printing; Journal of Computational Design and Engineering; 2015; pp. 47-54.

Gallagher, Juliet; Apple AR: Real World Objects Disappear Thanks Textures and ARKit; https://mobile-ar.reality.news/news/apple-ar-real-world-objects-disappear-thanks-textures-and-arkit-0178968/; Jul. 21, 2017; 7 pages.

Kawai, Norihiko et al.; Augmented Reality Marker Hiding with Texture Deformation; Journal of Latex class Files, vol. 14, No. 8; Aug. 2015; 13 pages.

Layar; Augmented Reality, Interactive Print; https://www.layar.com/; retrieved from the Internet Mar. 18, 2019; 3 pages.

M. Molitch-Hou, posted on Apr. 12, 2018. [Accessed Feb. 7, 2019] "Rize Uses Voxel Control for Augmented Reality in 3D-Printed Parts." https://www.engineering.com/3DPrinting/3DPrintingArticles/ArticleID/16786/Rize-Uses-Voxel-Control-for-Augmented-Reality-in-3D-Printed-Parts.aspx; 2 pages.

* cited by examiner

US 11,034,092 B2

3D-PRINTED OBJECT WITH DYNAMIC AUGMENTED-REALITY TEXTURES

BACKGROUND

The present invention relates in general to three-dimensional (3D) printing and in particular to use of 3D-printed objects by augmented-reality and virtual-reality applications.

3D printers use various technologies to "print" three-dimensional objects on demand, optionally under the control of a computer-aided design (CAD) system. For example, one type of 3D printer can use inkjet-printer-type printheads to create a complex plastic object by additively spraying layers of plastic substrate material. Other types of 3D printers include devices that generate three-dimensional metal objects from metal powders or use an extrusion technique known as fused deposition modeling.

Augmented-reality (AR) systems create an interactive experience that overlays computer-generated graphics into a real-world environment. A user may view an augmented reality through a computerized device that includes a display, such as a mobile phone or tablet. The device, by means of a visual input device like a camera or scanner, displays the user's actual environment, into which the computer-generated graphical objects have been seamlessly inserted. Because augmented-reality applications mix real and computer-generated objects, augmented reality is sometimes known as mixed reality.

Virtual-reality (VR) systems generate a completely artificial, immersive, interactive environment. A user may experience a virtual-reality environment by wearing a headset or "VR glasses" that generally track user head movements. For example, a head-tracking VR headset can rotate the virtual environment when the user turns his or her head. Other types of VR applications provide a less-immersive experience, such as a mapping application or a system that allows a user to interactively walk through a three-dimensional representation of a building.

SUMMARY

Embodiments of the present invention comprise systems, methods, and computer program products for objects with dynamic augmented-reality textures. An augmented-reality system interacts with a physical object that has been embossed or otherwise labeled with one or more bar-code identifiers. The system extracts data from each identifier and uses each element of extracted data to select a computer-generated texture or object. When displaying the physical object in the augmented-reality environment, the system either replaces the physical object with the computer-generated object or applies the computer-generated texture to a region of a rendered surface of a computer-generated object that corresponds to the physical object. The location and boundary of the region are selected as a function of the extracted data. The application's selection of computer-generated objects or textures may be modified at any time by a user command, a context-sensitive or environmental factor, an occurrence of a certain event within the augmented-reality environment, or a configuration setting of the application. A physical object labeled with multiple identifiers may be rendered in the augmented-reality environment as multiple computer-generated objects or with multiple textures that each correspond to a particular identifier and that may be manipulated independently. Copies of an identifier may be tiled within a bounded subset of the physical object's surface. The position and boundary of the subset identify to the application a position and boundary of the region of the surface of the computer-generated object.

DETAILED DESCRIPTION

Figure 1:
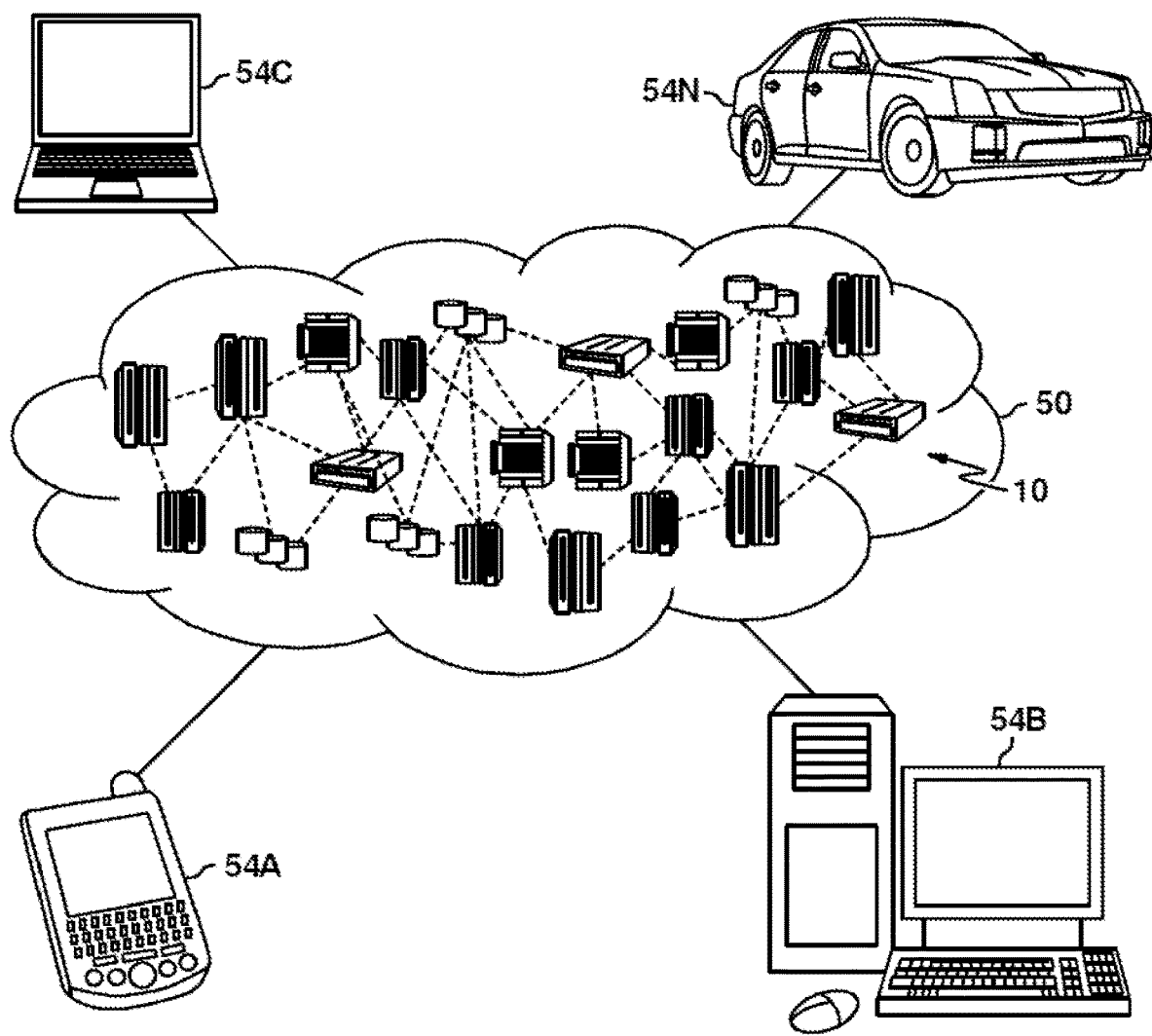
FIG. 1 depicts a cloud computing environment according to an embodiment of the present invention.

Embodiments of the present invention provide methods, systems, and computer program products for generating and using 3D-printed objects with dynamic augmented-reality textures. Such objects are embossed with an identifier like a conventional bar code or a two-dimensional or matrix bar code. For example, a 3D-printed scepter used in an augmented-reality game could be embossed with one or more QR CODE® two-dimensional or matrix bar codes.

The term QR CODE®, is noted in this document as a registered trade name used in commerce. In accordance with MPEP § 6.08.01, this term is capitalized wherever it appears and when appropriate, is accompanied by generic terminology. Use of this term should not be construed to limit embodiments of the present invention to use of QR CODE® matrix bar codes. Certain embodiments may accommodate other types of identifiers that encode data as visual or graphical content that is recognizable by a camera, scanner, or other visual input device. For example, such other types of identifiers include, but are not limited to, one-dimensional bar codes, other types of matrix bar codes, logos or other types of graphical objects that encode data into graphical features, and alphanumeric codes.

Embodiments of the present invention comprise augmented-reality, virtual-reality, and other types of software applications that generate and display virtual elements of a user's environment. These applications, upon detecting that the surface of a three-dimensional physical object is labeled with a certain type of visual identifier, infer data encoded into features of the visual identifier as an instruction to select and display a computer-generated texture, object, audio content, or other virtual object. The application then generates and inserts the virtual object into the application's interactive display of the user's environment.

In one example, an augmented-reality video game is run on a user's camera-equipped smartphone. The game continuously searches the video feed for matrix bar codes embossed into the surfaces of physical objects in the user's environment. When a user swings a 3D-printed rod embossed with a particular bar code in front of the camera, the game extracts data from the bar code and uses that data to assign the rod a corresponding "skin," texture, or surrogate object.

For example, if the game is configured with a medieval theme, the game displays the rod on the phone's screen as an ornate sword by overlaying an interactive, computer-generated three-dimensional sword image over the moving image of the rod received from the camera. Similarly, if the user configures the game with a space-opera theme, the game displays the rod as a light saber. Such overlaying is performed by known real-time video-processing technologies similar to the technology by which an animated cartoon character is inserted into a display of an augmented-reality gaming user's physical environment.

In a similar embodiment, the application would use data embedded into the bar code to select a palette of audio objects. For example, when the game is configured with the medieval theme, the application associates the rod with a set of metallic sounds. When the user swings the rod against a virtual stone wall displayed within the phone's augmented-reality environment, the game then plays a metallic metal-striking-rock sound. Similarly, if the game is configured with the space-opera theme, the application associates the rod—which is now displayed in the augmented-reality environment as a light-saber—with laser-like sounds that the application plays when the user swings the rod in front of the camera.

The application's selection of a virtual entity may be revised dynamically by a user. For example, a home-remodeling application could allow a user to interactively compare alternative décor choices by identifying various objects in a room with bar codes. A 3D-printed bare gray countertop, for example, may be labeled with a bar code. When the counter appears in the user's video display, the counter could be displayed as a granite, marble, composite, or wood counter, depending on the user's interactive selections. Once a selected texture has been associated with the printed countertop object, the user would be free to walk around the printed object in order to view details of the object from different angles. If the user selects a different counter material from a menu, the three-dimensional interactive countertop shown in the display automatically changes to the newly selected material. In this manner, the user can interactively view and walk through different color schemes, construction materials, lighting options, and even appliance models. In all cases, when the user selects a particular color scheme, style of décor, construction material, or other local or global setting, the application will use data extracted from each 3D object's bar code to select a corresponding texture for that object.

Some embodiments support the embossing of multiple bar codes on a single object. For example, a 3D-printed box may be embossed with four different matrix bar codes, each of which identifies a different texture. If a user an augmented-reality application attempts to display the printed object as a wooden box, each surface could be assigned a different texture, and those textures could be independently manipulated by the application. In this way, each surface of the box could be varied independently, in a realistic manner, when the box is picked up or rotated, or when a virtual or real lighting condition changes.

In some embodiments, a distinct bar code or other identifier may be placed on each surface of an object that has clearly bounded surfaces. For example, a surface of a cube-shaped object would need only one identifier per surface because each surface of a cube is clearly delineated by the cube's physical structure. On irregularly shaped or curved objects that do not have clearly delineated surfaces or regions, surfaces or regions may be delineated by a border embossed on the object by a 3D printer.

In other cases, a texture that corresponds to an identifier that labels one region of an object may itself have a boundary. In these latter embodiments, any convention desired by a user may be used to center or position the texture on the object. For example, a circular plate-shaped object may be embossed with a matrix bar code identifier located at the center point of the shield. A second identifier may be located in the upper-right quadrant of the circular shield. An application would then respond to a detection of the centrally located identifier by applying a metallic texture to the entire shield. If the virtual representation of the shield sustains a dent in the upper-right quadrant, the application would overlay an irregularly shaped second texture centered on the second identifier, where the second texture adds a dent to the first. In this manner, the second texture is applied on top of the first texture at a second location that is indicated by the location of the second identifier. The extent, size, shape, or range of the second texture is a fixed parameter associated with the second texture, but in other cases, multiple textures may be configured so that when applied to an object, the borders of the two textures interlock or blend seamlessly. Such functionality may be further facilitated by defining textures that have variable degrees of transparency or that comprise a transparent color.

In another example, a 3D-printed chair object is embossed with three different bar-code values, each of which identifies a distinct area of the chair to be assigned a distinct texture. A first bar-code value might identify a wooden texture for the chair's legs, a second value might identify an upholstery pattern, and a third value might identify a texture of a clear plastic covering. These textures could be linked such that if a program configuration changes, if the user makes a certain menu selection, if the chair is moved or interacts with another real or virtual object in the environment or if some extrinsic characteristic of the augmented-reality environment changes (such as a change in the environment's real or physical lighting), the three textures change in the user's display in a realistic, coordinated manner.

In yet another example, a first identifier is repeatedly imprinted throughout a first region of the surface of a physical object and a second identifier is repeatedly embossed throughout a second region of the surface of a physical object. In this case, the application would apply a first texture associated with the first identifier to the surface of the object bounded by the first region and would apply a second texture associated with the second identifier to the surface of the object bounded by the second region. In yet another variation, if the first texture is small in size relative to the first region, the application could tile multiple, possibly overlapping, copies of the first texture throughout the first region.

More sophisticated embodiments may correlate one or more virtual textures, selected as functions of data extracted from visual identifiers embossed on one or more surfaces of one or physical objects. Embodiments may also correlate one or more virtual textures with extrinsic data, such as application settings, user commands, or changing visual characteristics of a real-world physical element of an augmented environment.

For example, if each surface of a physical pyramid-shaped object is embossed with an identifier, the color and shading of each surface could be varied in real-time in a realistic, coordinated way as the object moves through the physical environment comprised by an augmented environment, as physical lighting conditions change throughout the physical environment, as virtual lighting conditions change due to movements of other virtual objects in the augmented environment, or as shadows are cast on the object in the augmented environment by other physical or virtual objects. Similarly, if a spherical physical object is represented as a crystal ball in an augmented environment, the application could dynamically generate and display in the augmented environment realistic refracted images of virtual or physical objects viewed through the ball and reflections of virtual or physical objects on the surface of the ball.

Similar advanced functionality may be implemented in virtual-reality applications in which a video input peripheral, such as a headset-mounted camera, detects a position, movement, or shape of a physical object and inserts a corresponding virtual object into the virtual-reality environment. The virtual object then replicates, within the virtual-reality environment, movements, interactions with other virtual elements in the virtual-reality environment, and other characteristics of the physical object.

In all these examples, virtual interactions between a virtual element rendered in response to data extracted from a physical object's visual identifier, are not restricted to visual characteristics like shading, lighting, shape, color, or texture. A virtual element may be rendered in any medium, or in any other form, supported by the application. For example, an element, comprised by a selected set of sounds, may play when the physical object interacts in certain ways with certain physical or virtual objects in an augmented-reality or virtual-reality environment.

Many other variations are possible. For example, a 3D-printed watch comprising an otherwise-featureless face embossed with a two-dimensional bar code could be overlaid into a virtual-reality or augmented-reality display enhanced with a virtual time display. The choice of analog or digital-style display and the displayed time would be selected by the application as a function of data inferred from the bar code. A 3D-printed automobile steering wheel labeled with a matrix bar code could allow an application to display an interactive, virtual representation of the wheel in a virtual environment in a style consistent with a particular make and model of a vehicle chosen by the user. A compliant application may display a physical winged object as a bird, an airplane, or a flying dinosaur, depending on the application's settings. And a colorless flag object may be interactively represented in virtual or augmented space as a flag of any nation, real or imaginary.

In all embodiments, an application visually detects a symbol imprinted in some manner on a physical object and extracts data from a visual or graphical feature of the symbol. The application then uses this data, possibly in conjunction with certain application settings or user selections, to associate virtual textures, computer-generated objects, or other virtual entities with that symbol. The application then substitutes these entities, in a virtual or augmented reality, for a physical texture of the object or of a region of the object, for another sensory characteristic of the object, such as a sound, or for the entire object.

In embodiments that comprise physical objects generated through an ad hoc or on-demand 3D-printing mechanism, a compatible 3D printer could request from the application, or from the user, basic information about the object to be printed. This information might, for example, include the object's physical size or other physically identifying characteristics; parameters that affect the readability of an identifying label, such as the object's surface reflectivity or color; or the application or module that the physical object will be used with. The type of identifier and the data encoded into the identifier may be chosen by the printer, by the application, by the user, or by a combination thereof. In some cases, an identifier data, a position of the identifier on a surface of the printed object, or the actual virtual representation of an identifier may be retrieved from local, networked, or cloud storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
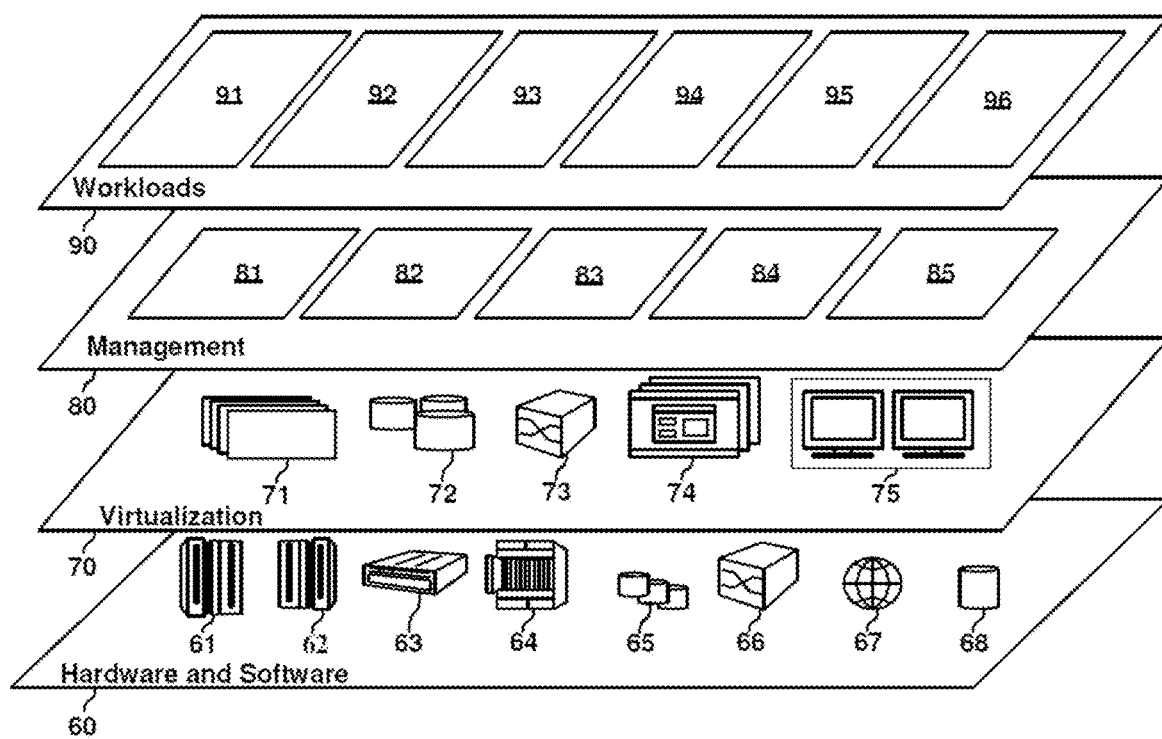
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of methods, systems, and computer program products for generating and using 3D-printed objects with dynamic augmented-reality textures.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
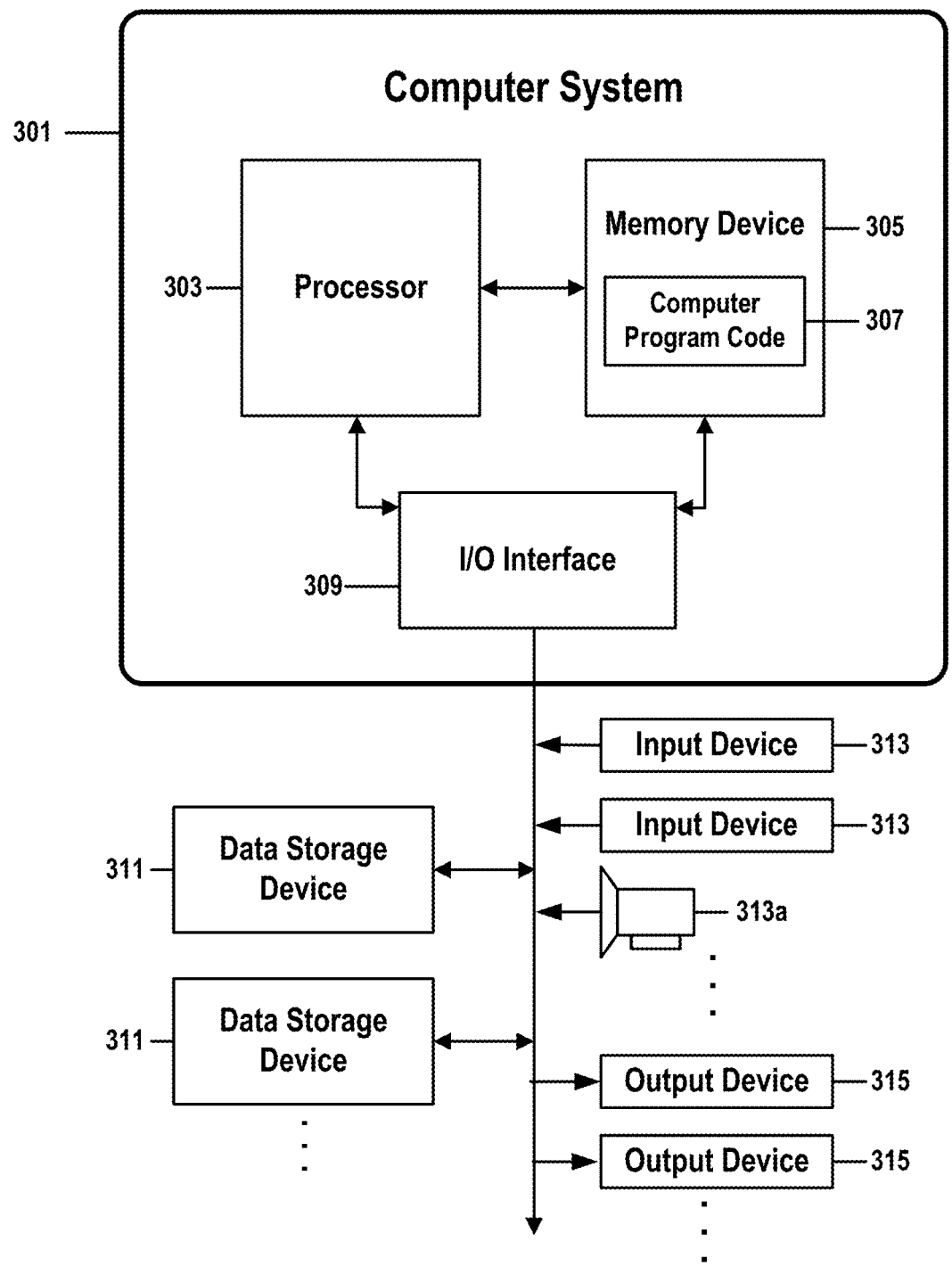
FIG. 3 shows the structure of a computer system and computer program code that may be used to implement a method for a 3D-printed object with dynamic augmented-reality textures in accordance with embodiments of the present invention.

FIG. 3 shows a structure of a computer system and computer program code that may be used to implement a method for a 3D-printed object with dynamic augmented-reality textures in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. In particular, input devices 313 may include one or more visual input peripherals 313a, such as a still camera, a video camera, or an optical scanner.

Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a 3D-printed object with dynamic augmented-reality textures in accordance with embodiments of the present invention, and may implement other embodiments described in this specification, including the methods illustrated in FIGS. 1-8. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a 3D-printed object with dynamic augmented-reality textures.

Any of the components of the present invention could be created, integrated, hosted, maintained, deployed, managed, serviced, supported, etc. by a service provider who offers to facilitate a method for a 3D-printed object with dynamic augmented-reality textures. Thus the present invention discloses a process for deploying or integrating computing infrastructure, comprising integrating computer-readable code into the computer system 301, wherein the code in combination with the computer system 301 is capable of performing a method for a 3D-printed object with dynamic augmented-reality textures.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a 3D-printed object with dynamic augmented-reality textures may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a 3D-printed object with dynamic augmented-reality textures is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
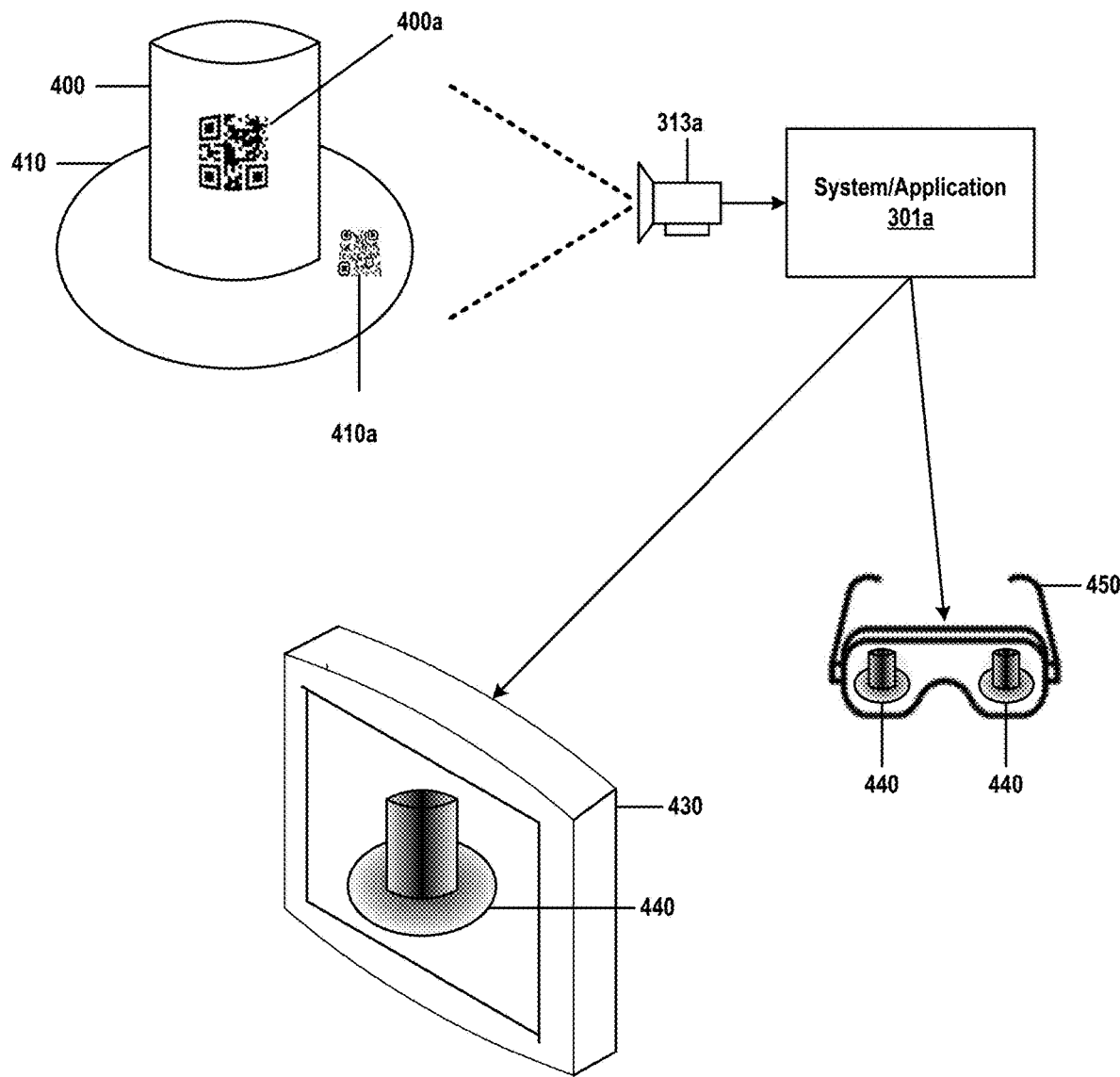
FIG. 4 shows a first example of an embodiment of the present invention that generates a virtual representation of a physical object on an augmented-reality display as a function of information encoded into the object's surface.

FIG. 4 shows a first example of an embodiment of the present invention that generates a virtual representation of a physical object on an augmented-reality display as a function of information encoded into the object's surface. FIG. 4 shows items 301a, 313a, and 400-440.

In FIG. 4, a processor 301a of a virtual-reality or augmented reality system receives, through a video camera or other optical input peripheral 313a, an image of a physical object. Each surface of the physical object is labeled with a two-dimensional matrix bar code.

In the example of FIG. 4, the physical object is a 3D-printed "stovepipe hat." The cylindrical surfaces 400 of the object are labeled with a first bar code 400a, which may be may be embossed into or otherwise affixed to surfaces 400. The circular "brim" surface 410 of the object is labeled with a second bar code 410a, which may be may be embossed into or otherwise affixed to surface 410. Both bar codes are visible within the field of vision of peripheral 313a.

Application or system 301a extracts data embedded into the two bar codes 400a and 410a and uses the extracted data to retrieve a pair of textures from a local or remote repository, such as a table stored on a local hard drive or a cloud-hosted database. The system then renders and applies the retrieved textures to images 440 of the physical object in the augmented-reality or virtual-reality environment displayed on an output device, such as a pair of virtual-reality glasses 450 or a display 430 of a smartphone, computer, tablet, or other user device. In this example, a first texture applied to the cylindrical surfaces of rendered images 440 comprise a first, vertical, shading pattern identified by bar code 400a; and a second texture applied to the brim surface of rendered images 440 comprises a second, axial, shading pattern identified by bar code 410a.

Figure 5:
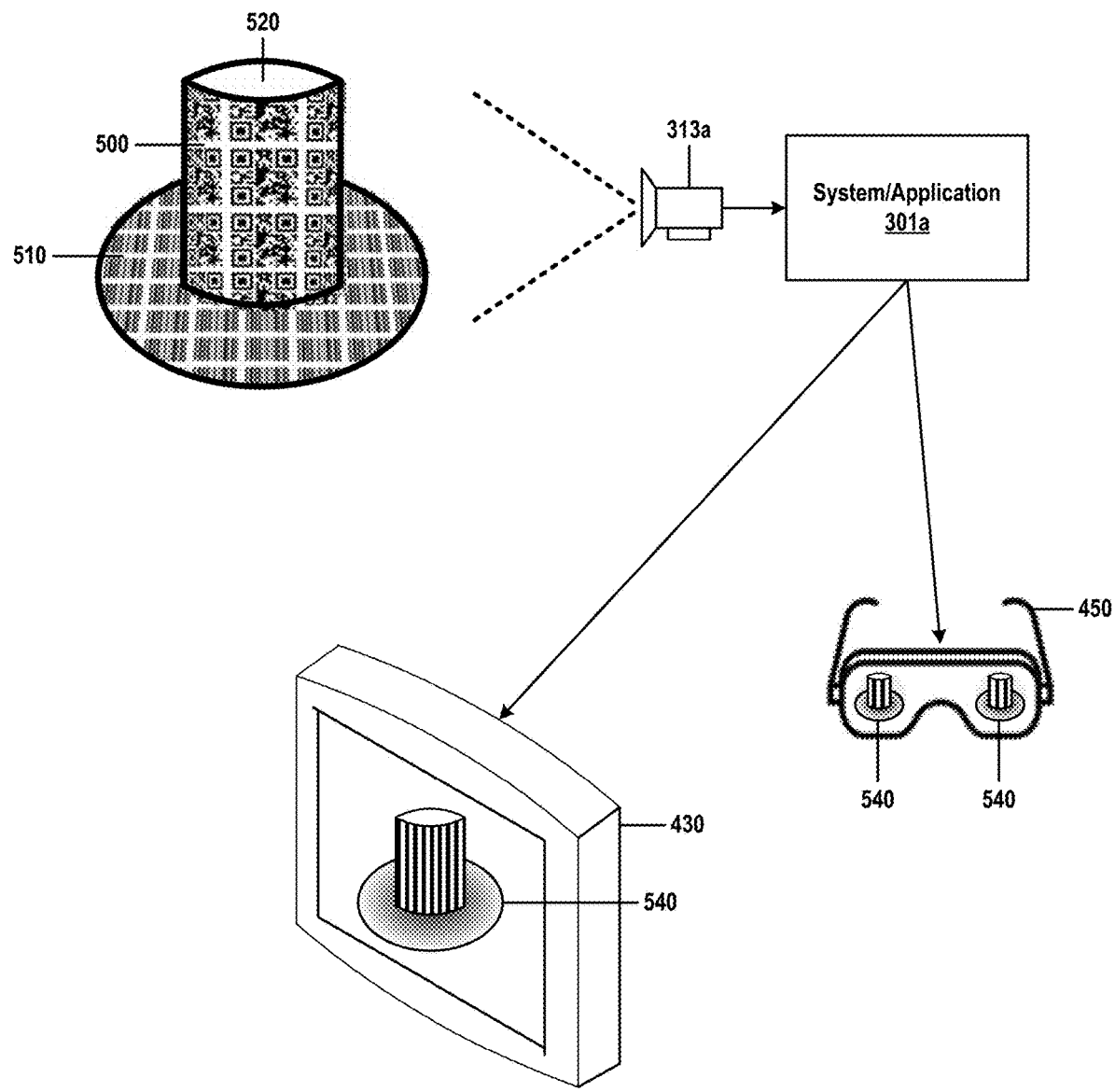
FIG. 5 shows a second example of an embodiment of the present invention that generates a virtual representation of a physical object on an augmented-reality display as a function of information encoded into the object's surface.

FIG. 5 shows a second example of an embodiment of the present invention that generates a virtual representation of a physical object on an augmented-reality display as a function of information encoded into the object's surface. FIG. 5 shows items 301a, 313a, 430, 450, and 500-540. Items 301a, 313a, 430, and 450 are similar in form and function to identically numbered items in FIG. 4.

In FIG. 5, processor 301a of a virtual-reality or augmented reality system receives, through a video camera or other optical input peripheral 313a, an image of a physical "stovepipe hat" object. Each surface of the physical object is tiled with repetitions of a two-dimensional matrix bar code.

In the example of FIG. 5, the curved cylindrical surface 500 of the hat is tiled with an array of copies of a two-dimensional bar code, which may be embossed into or otherwise affixed to surface 500. These copies completely cover the region bounded by the curved surface, but do not extend to the top 520 of the cylindrical shape. Similarly, the circular "brim" surface 510 of the object is tiled with an array of copies of a one-dimensional bar code, which may be may be embossed into or otherwise affixed to surface 510. This second array of copies completely covers the region bounded by the top surface of the torus-shaped surface 510 and, depending on the intent of an implementer, may also cover the bottom surface of the torus. At least parts of both arrays of bar codes are visible within the field of vision of peripheral 313a.

Like in FIG. 4, application or system 301a extracts data embedded into the bar codes 500a and 510a and uses the extracted each set of extracted data to retrieve a texture or other virtual entity from a local or remote repository, such as a from a cloud-hosted database or from a table stored on a local hard drive 311 or in computer memory 305. The system then renders and overlays the retrieved textures to images 550 of the physical object in a displayed augmented-reality or virtual-reality environment. The environment is displayed on an output device like computerized goggles or visors 550 or a monitor or display 530.

In this example, a first texture applied to the cylindrical surfaces of rendered images 550 comprise a first, vertical, shading pattern identified by bar code 500a; and a second texture applied to the brim surface of rendered images 550 comprises a second, axial, shading pattern identified by bar code 510a.

Unlike the example of FIG. 4, the boundary of each region of virtual object 540 is defined by a corresponding boundary of an area of the physical object's surface over which a corresponding bar code is tiled. Each region is identified by an area tiled by an identifier, such as a one-dimensional bar code, a two-dimensional matrix bar code, another type of graphical object, an alphanumeric identifier, or another identifier that can be detected and interpreted through visual means.

For example, one of the two bar codes is tiled across the vertical surface 500 of the physical object's cylindrical element, but does not extend to the top surface 520 of the cylindrical element. The corresponding texture—shown as a vertically ribbed surface on the virtual representation 540 of the physical object—thus wraps around the cylindrical element of the virtual object but is not applied to the top of virtual representation 540. Similarly, the other bar code is tiled across the top of the brim of the physical object and a corresponding texture is applied to the corresponding brim area of the virtual object 540.

This mechanism can be extended to allow numerous regions of a physical object's surface to be associated with different textures, and for an application to manage each texture independently. For example, an object's surface might be partitioned into four irregularly shaped, non-overlapping regions. Each region would be identified to the application by being populated with tiled copies of a bar code that is distinct to that region. The application would associate each region with a texture identified by that region's bar code and would render a virtual representation of the physical object in augmented-reality or virtual reality as having four surface textures. Each of the displayed textures would extend to the boundary of the region containing a corresponding bar code that identifies that texture. The application could vary each of the four textures independently or interactively, in response to changes in application settings, virtual interactions within the virtual or augmented environment, user commands, or other extrinsic factors.

Figure 6:
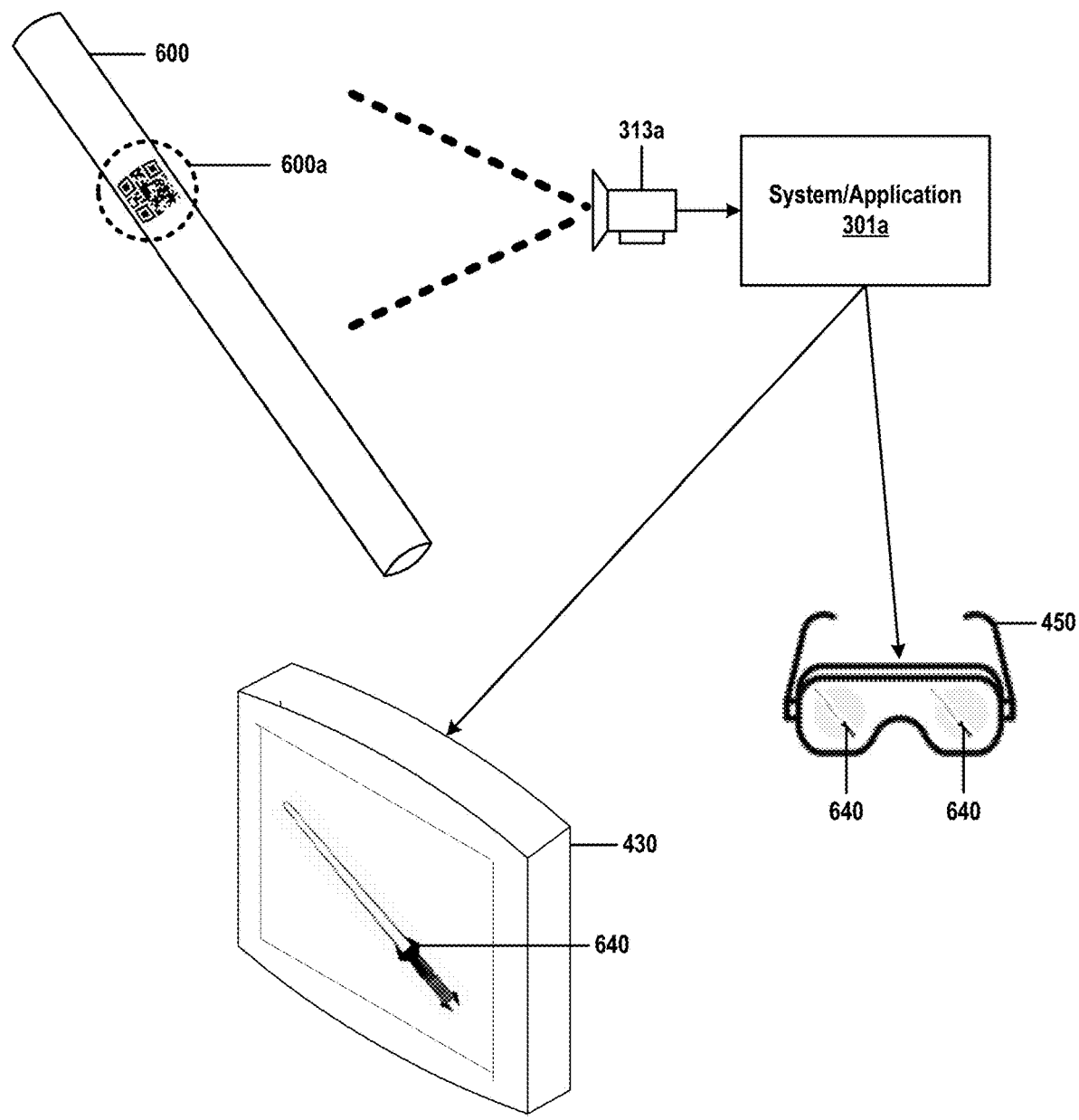
FIG. 6 shows a third example of an embodiment of the present invention that generates a virtual representation of a physical object on an augmented-reality display as a function of information encoded into the object's surface.

FIG. 6 shows a third example of an embodiment of the present invention that generates a virtual representation of a physical object on an augmented-reality display as a function of information encoded into the object's surface. FIG. 6 shows items 301a, 313a, 430, 450, and 600-640. Items 301a, 313a, 430, and 450 are similar in form and function to identically numbered items in FIGS. 4-5.

In this example, processor 301a of a virtual-reality or augmented reality system receives, through a video camera or other optical input peripheral 313a, an image of a rod-shaped physical object 600 that may be held by a user or otherwise manipulated by the user within the user's physical environment. The curved surface of the rod 600 is identified by a two-dimensional matrix bar code 600a, which in some embodiments is embossed into the surface when the rod 600 is manufactured by a 3D printer.

As in the examples of FIGS. 4 and 5, application 301a extracts data from identifier 600a and uses the extracted data to retrieve a virtual entity from a storage repository. In the example of FIG. 6, the virtual entity is a complete computer-generated object 640. Instead of merely applying a texture to a surface of a physical object 600, application 301a here substitutes the computer-generated object 640 for the physical object 600 in a virtual environment.

In the current example, the virtual object is a computer-generated three-dimensional model of a science-fiction light saber 640. Application 301a tracks the motion of physical object 600 within a video camera 313a's field of vision, but instead of displaying the actual object 600 on an output device 430 or 450, application 301a inserts a fully rendered three-dimensional representation 640 of the light-saber model into the display. Movements of the virtual light saber 640 within the virtual environment match movements of the physical rod 600 in the user's physical environment. The light saber 640 may also interact with other virtual objects and environmental conditions within the virtual environment. For example, if the rod 600 is swung through the air in the physical environment, light saber 640 will swing with an identical or analogous motion through the virtual environment, making a characteristic buzzing noise as it moves. In some embodiments, the buzzing noise is an additional virtual entity that is retrieved from a repository and is identified by data retrieved from identifier 600a.

In some embodiments, identifier 600a may store multiple encoded elements of data, each of which may identify a distinct virtual entity. For example, one element of data may identify the light saber model, a second element of data may identify a first audio file that should be played when the virtual saber 640 moves rapidly through the virtual environment, a third element may identify a second audio file that should be played when the virtual saber 640 strikes another virtual object in the virtual environment, and yet another element may identify another virtual object that is rendered as a glowing aura displayed around the blade of the virtual saber 640 when the saber is held still in a vertical position.

In other embodiments, multiple elements of data encoded into identifier 600a may identify multiple distinct virtual objects. For example, a first element could identify a 3D model of a light-saber handle, a second element would identify a 3D model of the saber's blade, and third and fourth objects would identify different positions of movable controls incorporated into the saber's handle. During gameplay, application 301a would combine these virtual objects in different ways to display the light saber 540 in various states of usage.

In this example, a first texture applied to the cylindrical surfaces of rendered images 660 comprise a first, vertical, shading pattern identified by bar code 600a; and a second texture applied to the brim surface of rendered images 660 comprises a second, axial, shading pattern identified by bar code 610a.

Figure 7:
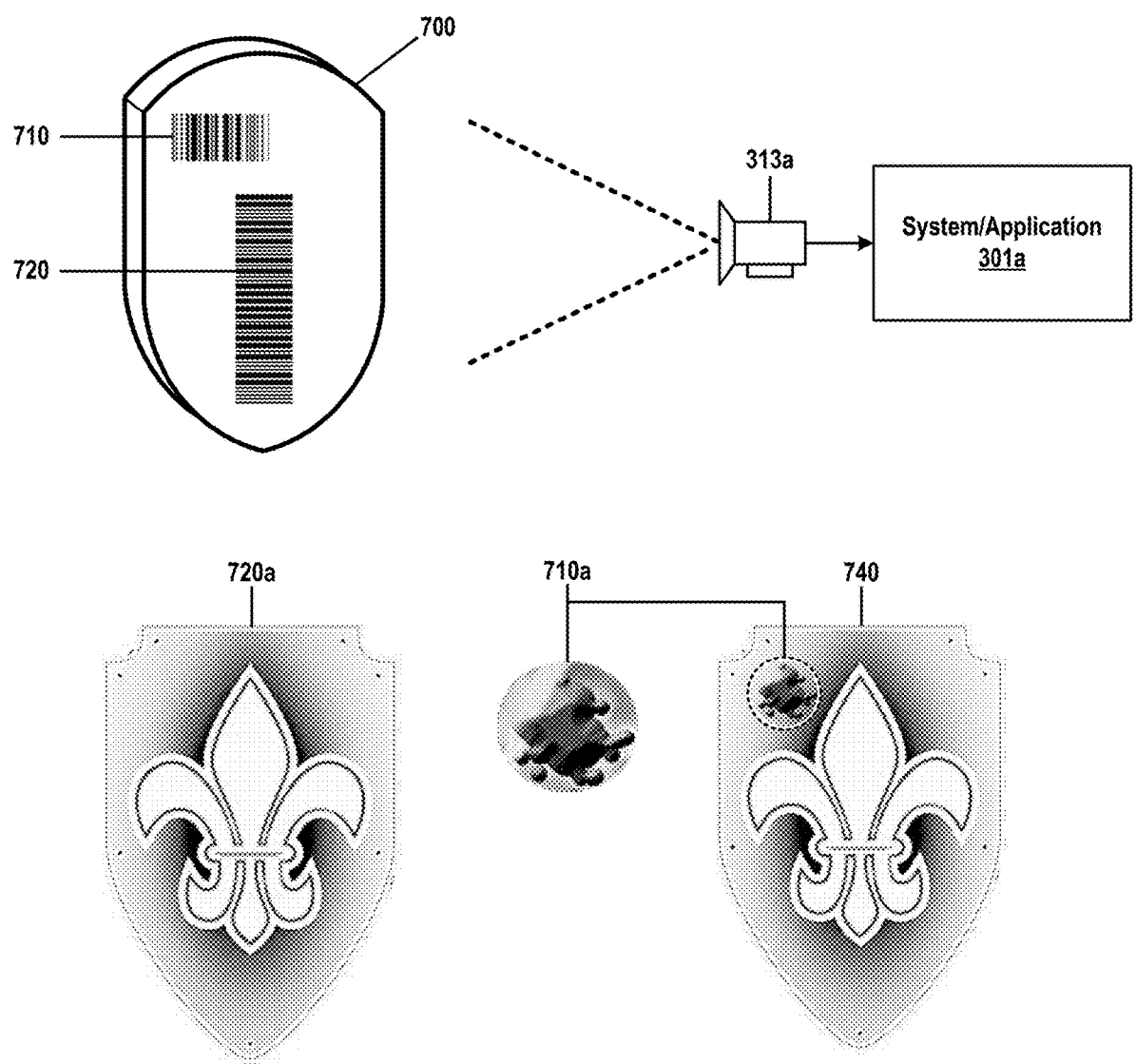
FIG. 7 shows virtual representations of a physical object on an augmented-reality display that are generated as a function of multiple elements of information encoded into the object's surfaces.

FIG. 7 shows virtual representations of a physical object on an augmented-reality display that are generated as a function of multiple elements of information encoded into the object's surfaces. FIG. 7 shows items 301a, 313a and 700-740. Items 301a and 313a are similar in form and function to identically numbered items in FIGS. 4-6.

In this example, processor 301a of a virtual-reality or augmented reality system receives, through a video camera or other optical input peripheral 313a, an image of a featureless shield-shaped physical object 700 that may be held by a user or otherwise manipulated by the user within the user's physical environment. One surface of shield 700 is identified by a pair of one-dimensional matrix bar codes 710 and 720, which in some embodiments are embossed into the surface when the shield 700 is manufactured by a 3D printer.

As in the examples of FIGS. 4-6, application 301a extracts data from identifiers 710 and 720 and uses each element of the extracted data to retrieve one or more virtual entities from one or more storage repositories. In the example of FIG. 7, the data extracted from bar code 720 identifies a skin or texture 720 to be rendered and applied to a virtual representation of the shield in a virtual-reality or augmented-reality environment. In other words, if a user moves the shield to interact with virtual entities in the virtual environment, the user will see a virtual shield emblazoned with the crest comprised by texture or skin 720a, and application 301a will have selected texture or skin 720a as a function of data decoded from bar code 720.

In the example of FIG. 7, a second element of identifying data, extracted from bar code 710, identifies a smaller texture 710a that represents a dent or other physical damage to the virtual representation of the shield. When the virtual shield sustains an appropriate blow from another virtual object in the virtual environment, the system 301a overlays the smaller, circular texture 710a on top of the shield's larger texture 720a. The result is the composite texture or skin 740, which represents a dented shield. As in the earlier examples, the virtual shield, damaged or not, tracks the movements of the physical shield 700, interacting with other virtual objects in the virtual environment, whenever the physical shield 700 is within the field of vision of video peripheral 313a.

Features of the embodiments of FIGS. 4-7 may be combined in any combination desired by an implementer. For example, bar code 710 or 720 of FIG. 7 may be replaced by a bounded region of tiled instances of a same bar code, as in FIG. 5. In another example, the virtual entities identified by bar code 710 and 720 may be any combination of the skins or textures of FIGS. 4 and 5 or of the complete virtual object of FIG. 6. In yet another example, the shield texture 720a and dent texture 710a may both be identified by a single identifier, rather than by the pair of identifiers 710 and 720 of FIG. 7, and any of the identifiers of FIGS. 4-7 may be a linear or one-dimensional bar code; a matrix or two-dimensional bar code, such as a QR CODE®; a graphical object; an alphanumeric code; a hologram; an animation or video clip played on a display device embedded into a surface of a physical object; a pattern generated by materials of differing reflectivity, brightness, or color; an RFID or other passive storage technology integrated with a visual output mechanism; or any other type of information-bearing mechanism that encodes data capable of being detected and decoded by a visual input device.

Figure 8:
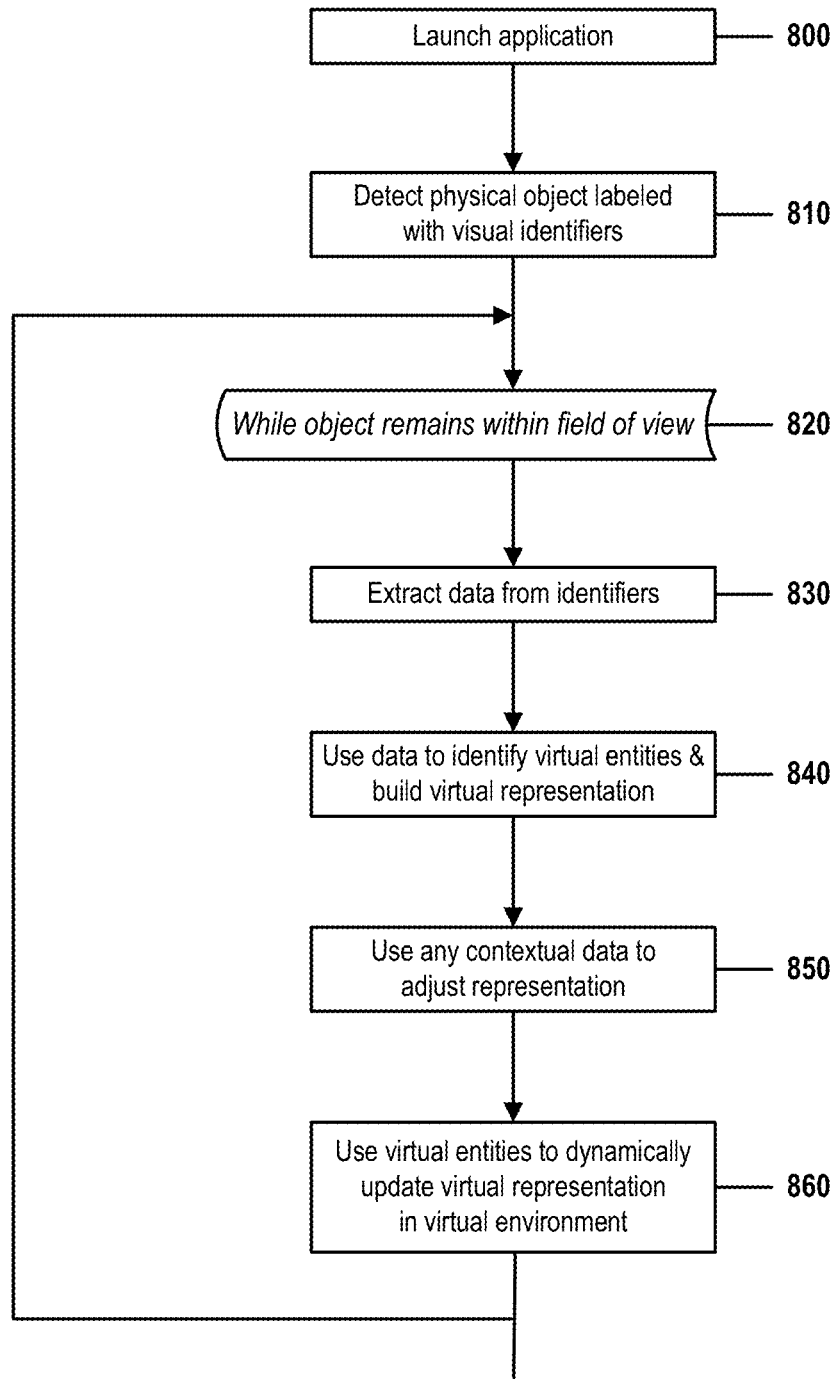
FIG. 8 is a flow chart that illustrates the steps of a method for a 3D-printed objects with dynamic augmented-reality textures in accordance with embodiments of the present invention.

FIG. 8 is a flow chart that illustrates the steps of a method for a 3D-printed objects with dynamic augmented-reality textures in accordance with embodiments of the present invention. FIG. 8 contains steps 800-860 which may be performed by embodiments that incorporate the platforms of FIGS. 1-3 and the mechanisms and workflows of FIGS. 4-7.

In step 800, a virtual-reality or augmented-reality application, device, or system 301a is launched. This application 301a may be run on any known computing device, such as a computer, a smartphone, a workstation, a tablet, or any other type of telecommunications or mobile device. The device is configured to be capable of receiving data from a visual input peripheral 313a, such as a video camera, and to be capable of retrieving previously stored virtual entities from a data-storage device 311.

In step 810, a processor of system 301a detects that a physical object has moved into the field of view of the visual peripheral 313a, and determines that the object is labeled with one or more visual identifiers. In certain embodiments, the physical object is a custom object associated with the application, or may be an object previously produced by means of a 3D-printing process. The identifiers may, depending on embodiment details, be a combination of any of the types of identifiers described in the examples of FIGS. 4-7. For example, the physical object may be a 3D-printed chair and each large surface of the chair may be embossed with a distinct QR CODE®.

Step 820 begins an iterative procedure of steps 820-860. This procedure continues to repeat so long as the 3D object remains within the field of view of the visual peripheral.

In embodiments capable of handling more than one physical object at a time, multiple iterations of the method of FIG. 8, including the iterative procedure of steps 820-860, may operate concurrently. In such cases, each instance of the iterative procedure of steps 820-860 may begin and end independently, as different combinations of the physical objects enter and leave the field of view.

In step 830, the processor extracts data encoded into each identifier. As described in the previous examples, each identifier may store more than one element of data. These extractions may be performed by any means known in the art, such as by decoding the graphical pattern of one-dimensional or matrix bar code, or by using a proprietary convention to translate features of a graphical object, embossed into the surface of a physical object, into components of a data element.

In step 840, the system uses each element of extracted data to retrieve a previously stored virtual entity from data storage device 311 or from a data structure previously read into computer memory 305 from a data storage device 311.

These visual entities may, as described in the previous FIGURES, comprise any sort of component that may be used to render a virtual representation of the physical object within the virtual environment. For example, a visual entity may be a texture intended to be applied to a surface of the virtual representation or to a region of a surface of the virtual representation; a 3D model from which may be generated a complete three-dimensional virtual object that entirely replaces the physical object in the virtual environment; or a set of textures and objects that together make up a three-dimensional virtual object. System 301a may, as in step 850, animate or dynamically modify complex virtual objects by manipulating or selectively displaying various combinations of textures or objects comprised by such a set.

In step 840, the system may also use one or more of the retrieved visual entities to build a virtual representation of the physical object. If the retrieved entity is a 3D model of the virtual representation, this procedure does not require any additional effort. In other cases, this procedure may comprise merely mapping one or more retrieved skins or textures onto surfaces of a previously stored 3D model of the physical object. In more complex embodiments, this procedure may require two or more retrieved entities to be combined into a single model. In all cases, the procedure may be performed through means known in the art by following previously rules configured into the application or system 301a. These rules may be identified by associating the rules with values of data extracted from an identifier in step 830.

In step 850, the system optionally adjusts or refines the virtual representation of the physical object. This optional step allows system 301a to dynamically adjust the virtual representation in response to interactive actions by a user or real-time changes to the virtual environment or to a configuration of application of system 301a.

For example, if system 301a identifies a certain configuration setting, system 301a may modify the virtual representation to conform to a particular user-selected theme or to adjust the resolution of the virtual representation to conform to a high, medium, or low, or display-quality setting. Similarly, if system 301a determines that a user has moved from a default, brightly lit environment to a deeply shadowed area, system 301a may modify the virtual representation to be more clearly viewed in the darker environment.

In step 860, system or application 301a displays and dynamically updates the virtual representation of the physical object in response to interactive user actions or real-time changes to the virtual environment or to a configuration of application of system 301a.

For example, if application 301a is a home-décor application and a user submits to system 301a a command to change a room's color scheme from cool to warm, the system 301a may in this step respond by changing the color of a virtual representation of a countertop physical object from deep blue to burnt sienna and by changing a virtual representation of kitchen flooring from blue tile to red-oak planking.

In an example based on the elements of FIG. 7, system 301a may respond to a real-time interaction within the virtual environment between a virtual representation of shield object 700 and another virtual object in the environment by overlaying dent texture 710a onto a shield texture 720a that had previously been rendered in the virtual representation. In some embodiments, the system might also determine that a certain sound, identified by data extracted from bar code 710, should be played when the interaction between the shield and the other object is displayed to the user within the virtual environment.

If the virtual environment is a multi-user environment, in which system 301a interacts with other systems or users, system 301a may in this step adjust a characteristic of one of its virtual representations in response to a change in another user's configuration settings or in response to an interaction with the other user in the multi-user virtual environment. For example, if another user turns on a spotlight during a night-time scene, system 301a may automatically adjust a virtual representation's color palette to more realistically portray the revised lighting conditions or to make the virtual representation easier to see clearly in the dark.

The order of certain steps of the method of FIG. 8 may be varied if desired by an implementer. For example, steps 830, 840, or elements of step 850 may be performed prior to the initiation of the iterative procedure of steps 820-860. This would allow systems 301a to run a streamlined version of the iterative procedure that comprises only step 860 or only steps 850 and 860. This alternative approach might improve efficiency or performance in cases where it is known that the shape of the physical object does not allow one of the object's identifiers to be hidden while another of the object's identifiers is within the field of view of the input device 313a. In such a case, once a physical object's identifiers are read once, there is no need to continue searching for other identifiers on the object's surface, or to extract and process additional data from any such identifiers.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

The iterative procedure of steps 820-860 continues to repeat in this manner, constantly refining the virtual representation of the physical objects: as the physical objects traverse the user's physical environment or as the position of input peripheral 313a changes in relation to the physical objects; as the virtual representations of the physical objects interact with other virtual objects or with extrinsic or environmental conditions comprised by the virtual environment; and as interactive user commands and internal rules and configuration settings of system 301a require revisions to the virtual representations. The iterative procedure ends when the physical object is no longer within the field of view of the visual input peripheral device 313a, but may resume the next time the physical object moves back into the device 313a's field of view.

What is claimed is:

1. An augmented-reality system comprising a processor, a memory coupled to the processor, a visual input peripheral device coupled to the processor, and a computer-readable hardware storage device coupled to the processor, the storage device containing program code configured to be run by the processor via the memory to implement a method for a 3D-printed object with dynamic augmented-reality textures, the method comprising:
   detecting that a previously produced physical object has come into a field of view of the visual input device;
   inferring a first inferred data from a first visual identifier incorporated into a physical surface of the physical object, where the first inferred data represents a computer instruction that identifies a first physical characteristic of a first region of the surface of the physical object;
   selecting a virtual entity as a function of the first inferred data; and
   enhancing, within an augmented-reality environment, the first region of a virtual representation of the physical object by substituting within the first region a computer-generated characteristic of the virtual entity for a physical characteristic of the physical object, where the computer-generated characteristic and the boundary of the first region are specified by the encoded computer instruction.

2. The system of claim 1, further comprising:
the processor selecting a second virtual entity as a function of additional data inferred from a second visual identifier incorporated into the physical surface of the physical object;
the processor enhancing, within the augmented-reality environment, a second region of the virtual representation by substituting within the second region a computer-generated characteristic of the second virtual entity for a second physical characteristic of the physical object; and
the processor responding to a user action by revising the representation of the first region or the representation of the second region such that the enhancing of the first representation is correlated to the enhancing of the second representation.

3. The system of claim 1, further comprising:
the processor detecting that a second physical object has come into a field of view of the visual input device;
the processor inferring additional data from a second visual identifier incorporated into a physical surface of the second physical object;
the processor selecting a second virtual entity as a function of the additional inferred data;
the processor enhancing, within the augmented-reality environment, a second region of a virtual representation of the second physical object by substituting within the second region a computer-generated characteristic of the second virtual entity for a physical characteristic of the second physical object; and
the processor responding to a user action by revising the representation of the first region or the representation of the second region such that the enhancing of the first representation is correlated to the enhancing of the second representation.

4. The system of claim 1, where the physical object is produced by a three-dimensional (3D) printer.

5. The system of claim 1, where the virtual entity is a computer-generated texture that is applied to a rendering of the virtual representation within the augmented-reality environment.

6. The system of claim 1, where the virtual entity is a three-dimensional computer-generated object that replaces the physical object within the augmented-reality environment.

7. The system of claim 1, where the first inferred data associates a plurality of virtual entities with the physical object.

8. The system of claim 1,
where the physical characteristic is a sound that is associated with a certain class of interaction between the virtual representation and an other object in the augmented-reality environment, and
where the enhancing further comprises:
   playing the sound during an occurrence of the certain class of interaction between the virtual representation and the other object.

9. The system of claim 1, where the first visual identifier is selected from the group consisting of: a two-dimensional bar code, a matrix bar code, an alphanumeric identifier, and a graphical image.

10. The system of claim 1, where a boundary and a position of the first region on the virtual representation are identified by a position of the first visual identifier on the physical surface of the physical object.

11. The system of claim 1,
where the first visual identifier is tiled throughout a subset of the physical surface of the physical object, and
where a boundary and a position of the first region on the virtual representation are identified by a boundary and a position of the subset on the physical surface of the physical object.

12. A method comprising:
detecting, by a processor of an augmented-reality system, a previously produced physical object has come into a field of view of a visual input device;
inferring a first inferred data from a first visual identifier incorporated into a physical surface of the physical object, where the first inferred data represents a computer instruction that identifies a first physical characteristic of a first region of the surface of the physical object;
selecting a virtual entity as a function of the first inferred data; and
enhancing, within an augmented-reality environment, the first region of a virtual representation of the physical object by substituting within the first region a computer-generated characteristic of the virtual entity for a physical characteristic of the physical object, where the computer-generated characteristic and the boundary of the first region are specified by the encoded computer instruction.

13. The method of claim 12, further comprising:
the processor selecting a second virtual entity as a function of additional data inferred from a second visual identifier incorporated into the physical surface of the physical object;
the processor enhancing, within the augmented-reality environment, a second region of the virtual representation by substituting within the second region a computer-generated characteristic of the second virtual entity for a second physical characteristic of the physical object; and
the processor responding to a user action by revising the representation of the first region or the representation of the second region such that the enhancing of the first representation is correlated to the enhancing of the second representation.

14. The method of claim 12, further comprising:
the processor detecting that a second physical object has come into a field of view of the visual input device;
the processor inferring additional data from a second visual identifier incorporated into a physical surface of the second physical object;
the processor selecting a second virtual entity as a function of the additional inferred data;
the processor enhancing, within the augmented-reality environment, a second region of a virtual representation of the second physical object by substituting within the second region a computer-generated characteristic of the second virtual entity for a physical characteristic of the second physical object; and
the processor responding to a user action by revising the representation of the first region or the representation of the second region such that the enhancing of the first representation is correlated to the enhancing of the second representation.

15. The method of claim 12, where the virtual entity is selected from the group consisting of:
a three-dimensional computer-generated object that replaces the physical object within the augmented-reality environment, and
a computer-generated texture that is applied to a rendering of the virtual representation within the augmented-reality environment.

16. The method of claim 12, further comprising providing at least one support service for at least one of creating, integrating, hosting, maintaining, and deploying computer-readable program code in the computer system, wherein the computer-readable program code in combination with the computer system is configured to implement the detecting, the inferring, the selecting, and the enhancing.

17. A computer program product, comprising a computer-readable hardware storage device having a computer-readable program code stored therein, the program code configured to be executed by an augmented-reality system comprising a processor, a memory coupled to the processor, a visual input peripheral device coupled to the processor, and a computer-readable hardware storage device coupled to the processor, the storage device containing program code configured to be run by the processor via the memory to implement a method for a 3D-printed object with dynamic augmented-reality textures, the method comprising:
detecting, by a processor of an augmented-reality system, a previously produced physical object has come into a field of view of a visual input device;
inferring a first inferred data from a first visual identifier incorporated into a physical surface of the physical object, where the first inferred data represents a computer instruction that identifies a first physical characteristic of a first region of the surface of the physical object;
selecting a virtual entity as a function of the first inferred data; and
enhancing, within an augmented-reality environment, the first region of a virtual representation of the physical object by substituting within the first region a computer-generated characteristic of the virtual entity for a physical characteristic of the physical object, where the computer-generated characteristic and the boundary of the first region are specified by the encoded computer instruction.

18. The computer program product of claim 17, further comprising:
the processor selecting a second virtual entity as a function of additional data inferred from a second visual identifier incorporated into the physical surface of the physical object;
the processor enhancing, within the augmented-reality environment, a second region of the virtual representation by substituting within the second region a computer-generated characteristic of the second virtual entity for a second physical characteristic of the physical object; and
the processor responding to a user action by revising the representation of the first region or the representation of the second region such that the enhancing of the first representation is correlated to the enhancing of the second representation.

19. The computer program product of claim 17, further comprising:
- the processor detecting that a second physical object has come into a field of view of the visual input device;
- the processor inferring additional data from a second visual identifier incorporated into a physical surface of the second physical object;
- the processor selecting a second virtual entity as a function of the additional inferred data;
- the processor enhancing, within the augmented-reality environment, a second region of a virtual representation of the second physical object by substituting within the second region a computer-generated characteristic of the second virtual entity for a physical characteristic of the second physical object; and
- the processor responding to a user action by revising the representation of the first region or the representation of the second region such that the enhancing of the first representation is correlated to the enhancing of the second representation.

20. The computer program product of claim 17, where the virtual entity is selected from the group consisting of:
- a three-dimensional computer-generated object that replaces the physical object within the augmented-reality environment, and
- a computer-generated texture that is applied to a rendering of the virtual representation within the augmented-reality environment.

* * * * *